(12) United States Patent  (10) Patent No.: US 7,845,860 B2
Fiorentino et al.  (45) Date of Patent: Dec. 7, 2010

(54) METHOD FOR CONNECTING MULTICORE FIBERS TO OPTICAL DEVICES

(75) Inventors: Marco Fiorentino, Mountain View, CA (US); Raymond Beausoleil, Redmond, WA (US); Duncan Stewart, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 12/254,490

(22) Filed: Oct. 20, 2008

(65) Prior Publication Data

US 2009/0180734 A1  Jul. 16, 2009

Related U.S. Application Data

(60) Provisional application No. 61/020,372, filed on Jan. 10, 2008.

(51) Int. Cl.
  *G02B 6/36* (2006.01)
  *G02B 6/12* (2006.01)
(52) U.S. Cl. ............................. 385/89; 385/14; 385/31; 385/125
(58) Field of Classification Search ........................ None
  See application file for complete search history.

(56) References Cited

U.S. PATENT DOCUMENTS

| 4,300,816 A | 11/1981 | Snitzer et al. |
| 4,828,349 A | 5/1989 | Nakasuji |
| 5,535,294 A | 7/1996 | Kamuz et al. |
| 6,301,420 B1 | 10/2001 | Greenaway et al. |
| 7,324,716 B2 * | 1/2008 | Epitaux ........................ 385/14 |
| 7,503,703 B1 * | 3/2009 | Thorson ....................... 385/71 |
| 7,565,047 B2 * | 7/2009 | Nishizawa et al. ............ 385/33 |
| 2004/0175082 A1 | 9/2004 | Birks et al. |
| 2006/0045418 A1 | 3/2006 | Cho et al. |
| 2006/0062533 A1 * | 3/2006 | Hachiwaka et al. ......... 385/125 |
| 2009/0297099 A1 * | 12/2009 | Benjamin et al. ............. 385/32 |

OTHER PUBLICATIONS

Dirk Taillaert, et al., "A Compact Two-Dimensional Grating Coupler Used as a Polarization Splitter", IEEE Phontonics Technology Letters, vol. 15, No. 9, Sep. 2003, pp. 1249-1251.

Dirk Taillaert, et al., "An Out-of-Plane Grating Coupler for Efficient Butt-Coupling Between Compact Planar Waveguides and Single-Mode Fibers", IEEE Journal of Quantum Electronics, vol. 38, No. 7, Jul. 2002, pp. 949-955.

* cited by examiner

*Primary Examiner*—Tina M Wong

(57) ABSTRACT

A method for connecting a photonic crystal fiber having a plurality of cores connected to an optical device. An end of the photonic crystal fiber may be placed on a surface of an optical device having a plurality of coupling pads. A first core of the end of the photonic crystal fiber may be positioned over a first coupling pad on the optical device to enable a threshold amount of a coherent beam of light to propagate through the first core and first coupling pad. A second core of the end of the photonic crystal fiber is aligned to a second coupling pad on the optical device to enable a threshold amount of another coherent beam of light to propagate through the second core and second coupling pad. The end of the photonic crystal fiber may be adhered to the surface of the optical device while the position of the first and the second cores relative to the first and the second coupling pads, respectively, is maintained.

20 Claims, 6 Drawing Sheets

METHOD FOR CONNECTING MULTICORE FIBERS TO OPTICAL DEVICES

CROSS-REFERENCE TO RELATED APPLICATION

The present application claims priority from provisional application Ser. No. 61/020,372, filed Jan. 10, 2008, the contents of which are incorporated herein by reference in their entirety.

BACKGROUND

In the past, connections between electronic chips and boards have typically used electrical connectors, conductors, pins, cables, or buses. Connections between electronic chips and boards can allow communication between various electrical circuits and systems and can create greater functionality of a system. Electrical signals typically propagate slower than light or optical signals. In addition, electrical devices can use more power per bit of information to generate or drive electrical signals within an electrical cable or bus. An optical fiber can transmit and receive more data than an electrical conductor, which allows optical channels to pack a higher density of data (more data or greater bandwidth) than electrical conductors.

However, individual optical fibers can be more expensive to connect than electrical conductors. Often boards and chips require greater data densities than a single optical fiber can provide.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Alterations and further modifications of the inventive features illustrated Herein, and additional applications of the principles of the inventions as illustrated herein, which would occur to one skilled in the relevant art and having possession of this disclosure, are to be considered within the scope of the invention.

Figure 1:
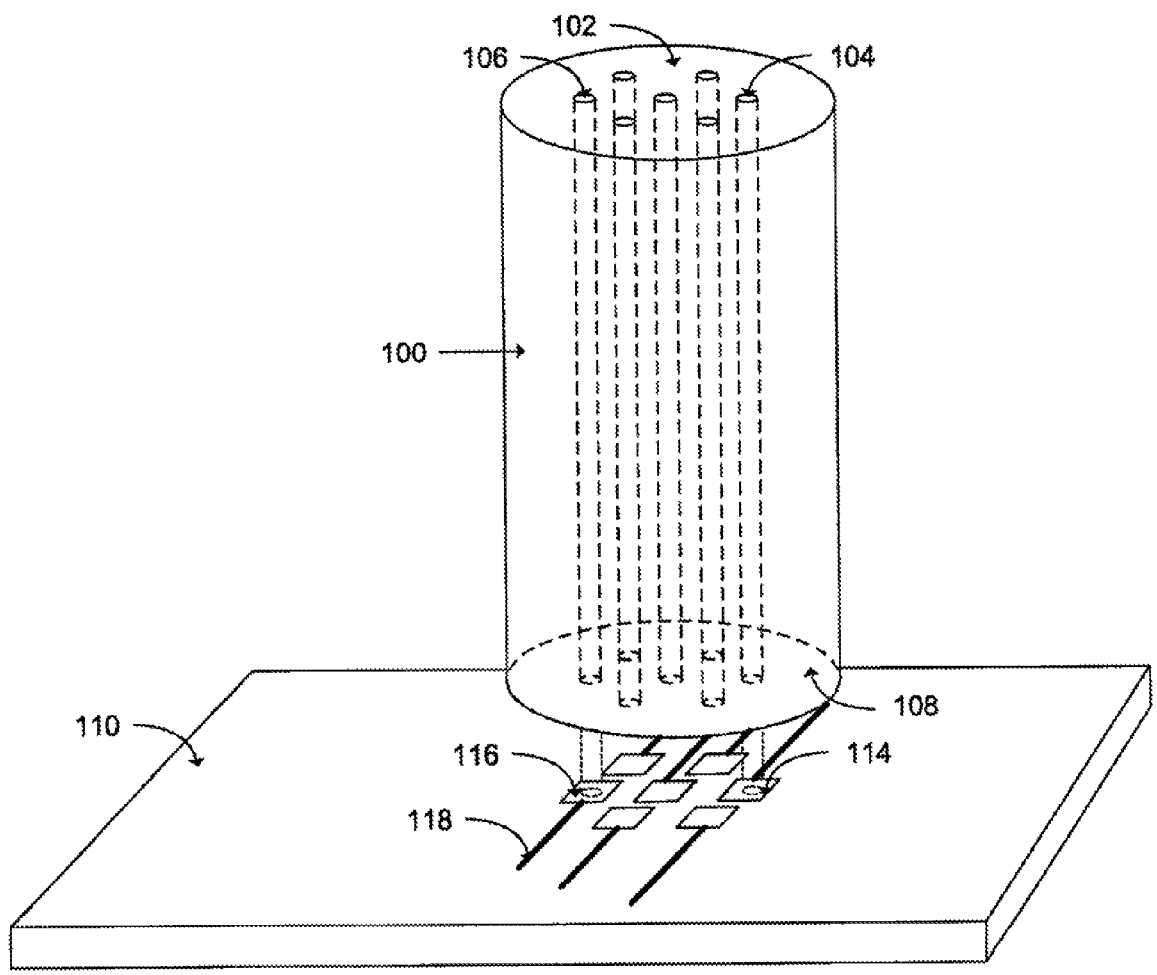
FIG. 1 is an illustration of a photonic crystal fiber having a plurality of cores coupled to an optical device in accordance with an embodiment of the present invention.

FIG. 1 provides an illustration of an embodiment of a method for positioning a first core 104 and aligning a second core 106 of a multicore photonic crystal fiber 100 to a first coupling pad 114 and a second coupling pad 116 on the optical device 110, respectively. Photonic crystal fibers can be used in optical communication where light is used to transmit optical signals or data from one optical device to another optical device, similar to the way electronic devices use electrical signals to communicate and transmit data between electronic devices.

Photonic crystal fibers (PCFs) 100 can include multiple cores 104 and 106. A core can allow a coherent beam of light to propagate from one end of the PCF to another end of the PCF. Each core can allow a separate coherent beam of light to propagate such that the beams of light in adjacent cores do not substantially add, diminish, or distort the tight beams in the core. Each beam of light can include light with a plurality of wavelengths providing a plurality of channels through each core. The cores can comprise a substantially transparent material formed from a solid, a gas, a liquid, or a void, which allows light to propagate through the core. Using multiple cores between devices can expand the amount of data that can be transmitted between optical devices, which can allow for greater signal bandwidth and therefore superior data bandwidth.

Figure 2:
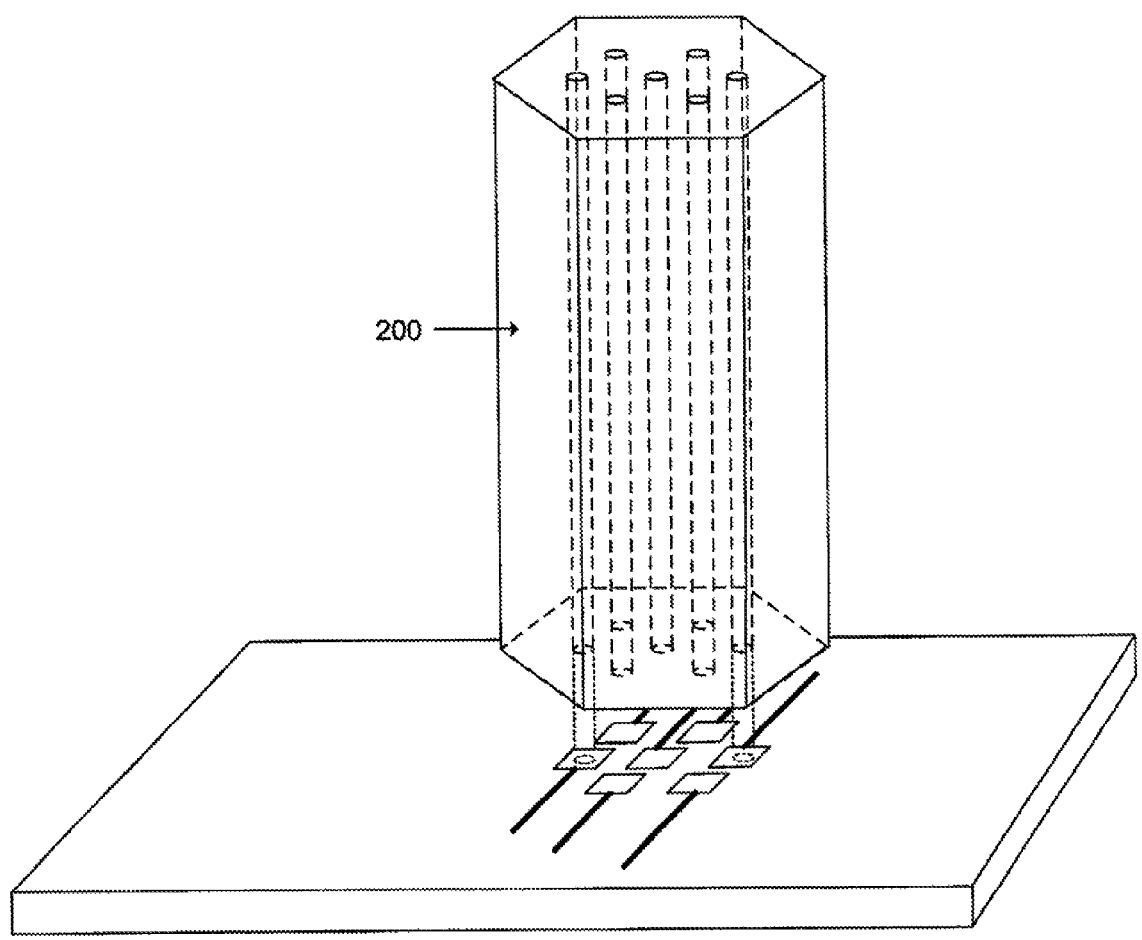
FIG. 2 is an illustration of a hexagonally shaped photonic crystal fiber having a plurality of cores coupled to an optical device in accordance with an embodiment of the present invention

Multicore PCFs can have various external geometries and various core geometries. The body of the PCF can be shaped as a circular cylinder 100, as illustrated in FIG. 1. Alternatively, the body of the PCF can be shaped with a hexagonally tubular 200 shape as illustrated in FIG. 2. The PCF can also be formed using other geometries or contain additional notches, grooves, or protrusions on the perimeter of the body that can be used to align the PCF with connectors. The PCFs can be manufactured from silicon oxide, polymers, and types of materials that are substantially optically transparent at the desired frequency. The external surface of the PCF can also be covered in a cladding to protect the PCF from external light and environmental damage.

The cores in the PCF can be substantially uniform is size, shape, and position at both ends of the PCF. The configuration of the cores within the PCF can be uniform due to the drawing out process used in the manufacture of PCFs. The cores can be fixed in relatively the same location between the ends of the PCF. The uniformity of shape and configuration of the cores in the PCFs can allow PCFs to be used to connect devices with narrow spacing and tolerances between couplings pads. The spacing between the cores of the PCF can be over twice the diameter of the cores, which can make the alignment of cores with coupling pads necessary. PCFs with a plurality of cores can differ from a typical optical fibers bundle with a plurality of optical fibers, because the PCF can be a single fiber with the position of each core fixed relative to the other cores through the length of the PCF, where as each optical fiber in the optical fiber bundle may not have a fixed position relative to the other optical fibers through the length of the optical fiber bundle.

An optical device 110, as shown in FIG. 1, can include any device that can emit or detect a coherent beam of light or any device that can propagate a coherent beam of light. The optical device may also utilize and process electrical signals. The optical device can be various sizes. For example, the optical device can be large like a printed circuit board or small like a semiconductor die. Examples of optical devices can include a computer chip, a printed circuit board, an optical testing device, an electro-optic board, an electro-optic chip, an electro-optic die, an electro-optic wafer, an electro-optic substrate, an optical board, an optical chip, an optical die, an optical wafer, and an optical substrate.

The optical device 110 may contain coupling pads 114 and 116. Coupling pads can provide an interface to the optical device allowing optical signals to be transmitted (emitted) or received (detected) by the optical device. The coupling pads can be any size, shape, geometry, or thickness. Examples of coupling pads can include a wave guide coupler, an emitter, a detector, a pigtail, a launching pad, a plurality of wave guide couplers, a plurality of emitters, a plurality of detectors, a plurality of emitters or detectors coupled through a wave guide 118 to a wave guide coupler, a plurality of emitters and detectors coupled through a wave guide to a wave guide coupler, or a combination thereof. A wave guide coupler can include a grating coupling or a titled-facet coupling, which may or may not be controlled by a microelectromechanical system (MEMS). Emitters and detectors can be aligned to both ends of the PCF 100 to allow for full duplex communication between optical devices. Having a plurality of emitters and detectors coupled to a single wave guide or core can allow dense wave division multiplexing (DWDM) to be used using a single core of the PCF.

A method for connecting the PCF 100 having a plurality of cores to the optical device 110 may include placing one end (a proximal end) 108 of the PCF on a surface of the optical device (a proximal optical device) that can include a plurality of coupling pads 114, 116. The proximal end of the PCF may be a first end of the PCF used to make a connection, while a distal end of the PCF may be a second end of the PCF used to make a connection. The proximal optical device may be a first optical device used to make a connection, while a distal optical device may be a second optical device used to make a connection.

A first core 104 of the proximal end 108 of the PCF 100 can be positioned relative to a first coupling pad 114 on the proximal optical device 110 to enable a threshold amount of a coherent beam of light to propagate through the first core and the first coupling pad. When a coherent beam of light is being emitted from the proximal optical device, the threshold amount of the beam of light may travel through the core for the core to be considered properly positioned. When a coherent beam of light is being emitted from the proximal optical device, the threshold amount of the beam of light may travel through the coupling pad for the core to be considered properly positioned on the proximal optical device. The beam of light may travel through the core and coupling pad to be considered properly positioned on the proximal optical device. The threshold amount of light may be a minimal amount of light used to provide a desired level of communication between optical devices.

A second core 106 of the proximal end 108 of the PCF 100 can be aligned to a second coupling pad 116 on the proximal optical device to enable a threshold amount of a coherent beam of light to propagate through the second core and the second coupling pad. The position of the first core 104 relative to the first coupling pad 114 can be maintained while the second core is aligned to a second coupling pad by rotating the photonic crystal fiber about the axis of the first core. Besides rotating any other means for aligning the second core to the second coupling pad white maintaining the position of the first core to the first coupling pad may be used. When a threshold amount of a coherent beam of light can propagate through the second core and the second coupling pad the second core may be considered to be properly aligned on the proximal optical device.

With the first core 104 properly positioned and the second core 106 properly aligned, the proximal end 108 of the PCF 100 may be adhered to the surface of the proximal optical device 110. The position of the first core and the second core relative to the first coupling pad 114 and the second coupling pad 116, respectively, can be maintained while the proximal end of the PCF is adhered to the surface of the proximal optical device. An end (the proximal end 108 or the distal end 102) of the PCF can be adhered to the surface of the proximal optical device using a means for adhering the fiber, such as an ultraviolet curable epoxy. The process of adhering the PCF to the optical device can be called pigtailing. Proximal and distal are used for reference purposes only. The process may be reversed, wherein the distal end of the PCF is first connected to a distal end of the fiber. Additionally, the proximal and distal ends of the PCF may be substantially similar such that the ends can be reversed while still enabling the optical devices to be coupled together.

The PCF can include a plurality of cores. For example, the PCF illustrated in FIG. 1 shows a PCF having seven cores. When at least two of the cores are aligned, the remaining cores may be aligned with the remaining coupling pads on the desired optical device after the proper positioning of the first core and proper alignment of the second core. Aligning two points (cores) on a first two dimensional surface (an end of the PCF) with two other points (coupling pads) on a second two dimension surface (a surface of an optical device) will substantially align all the points of the first surface to all the points to the second surface.

For example, aligning two cores of the PCF to two coupling pads on the optical device can enable the remaining five cores to be aligned to the remaining five coupling pads, as shown in FIG. 1. The PCF can include anywhere from three to hundreds of separate cores that can each be aligned to a coupling pad on an optical device sufficient to allow a threshold amount of a coherent beam of light to pass through. The accuracy of aligning the remaining cores may improve when the distance between the first and second core on an end of the PCF is a substantially maximum distance between any two active cores of the PCF. An active core may be a core that is coupled to a coupling pad capable of emitting or detecting light.

The plurality of cores can exceed the number of coupling pads or active coupling pads. An active coupling pad may be a coupling pad that is capable of emitting or detecting light. A core that is not aligned with any coupling pads may not be active and may not be used. The plurality of coupling pads may exceed the number of cores of the PCF. The additional coupling pads at a proximal optical device not coupled to cores of the PCF may not emit or detect a coherent beam of light to or from a second optical device, so those uncoupled coupling pads may not be used.

In another embodiment, the alignment of the proximal end 108 of the PCF 100 to the optical device may be verified by measuring an intensity of a coherent beam of light traveling through a third core of the photonic crystal fiber and a third coupling pad. The coherent beam may be emitted from an optical device on the proximal end of the PCF and detected by an optical device or testing device on the distal end 102 of the PCF. The coherent beam may be emitted from an optical device or testing device on the distal end of the PCF and detected by an optical device on the proximal end of the PCF. The coherent beam of light may propagate through the core traveling either direction either from the proximal end of the PCF to the distal end of the PCF, or from the distal end of the PCF to the proximal end of the PCF.

The verification and measurement of the coherent beam of light traveling through a third core of the PCF 100 and a third coupling pad can allow the alignment of the proximal end 108 of the PCF with the coupling pads on the optical device 110 to be verified and adjusted on the surface of the proximal optical device before the proximal end of the PCF is adhered to the proximal optical device. The verification and measurement of coherent beams of light may use a plurality of the remaining cores and corresponding coupling pads. The verification and measurement of coherent beams of light may be used to re-verify the first core and second core relative to the first coupling pad and second coupling pad, respectively.

The proximal end 108 of the PCF adhered to the surface of the proximal optical device 110 may be coupled to the distal optical device or testing device on the distal end 102 of the PCF using a series of PCFs with their cores optically coupled together, to effectively form a single PCF. The series of PCFs may optically couple their cores together using connectors.

In another embodiment, positioning the first core of the proximal end of the PCF to the first coupling pad of the proximal optical device and aligning the second core of the proximal end of the PCF to the second coupling pad of the proximal optical device may use a substantially maximum amount of light to propagate through the first core and the first coupling pad and the second core and the second coupling pad, respectively. Using a substantially maximum amount of light to position the first core relative to the first coupling pad and to align the second core relative to the second coupling pad on the optical device, enables the optical device to emit and detect optical signals with improved efficiency, lower power usage, and improved reliability.

Figure 3:
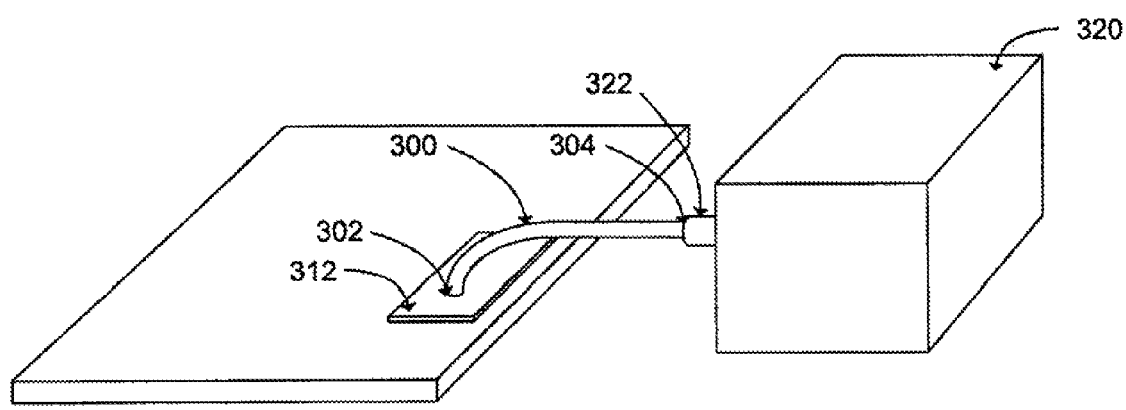
FIG. 3 is an illustration of a multicore photonic crystal fiber coupled to a testing device in accordance with an embodiment of the present invention.

In one embodiment as shown in FIG. 3, a distal end 304 of the PCF 300 can be coupled to a testing device 320 with detectors. The testing device may include a plurality of detectors oriented to be substantially aligned with the cores of the distal end of the PCF, so that the detectors can detect coherent beams of light traveling through the plurality of cores emitted from the plurality of coupling pads at the proximal optical device 312. Detecting coherent beams of light traveling through the cores from the proximal optical device can enable the plurality of cores at the proximal end 302 of the PCF to be positioned and aligned with the plurality of coupling pads at the proximal optical device without the distal end of PCF being connected to a distal (second) optical device.

In another embodiment, a distal end 304 of the PCF 300 can be coupled to a testing device 320 with emitters. The testing device may include a plurality of emitters oriented to be substantially aligned with the cores of the distal end of the PCF, so that the emitters can emit coherent beams of light traveling through the plurality of cores to be detected by the plurality of coupling pads at the proximal optical device 312. Emitting coherent beams of light configured to travel through the cores to the proximal optical device can enable the plurality of cores at the proximal end 302 of the POE to be positioned and aligned with the plurality of coupling pads at the proximal optical device without the distal end of PCF being connected to a distal (second) optical device.

In a further embodiment, the distal end 304 of the PCF 300 can be coupled to a testing device 320 having a plurality of emitters and a plurality of detectors to emit and to detect coherent beams of light propagating through the cores of the PCF using the methods previously described. The connector 322 and PCF can be constructed and formed to support and connect the distal end of the PCF and align the cores in the PCF to emitters and detectors of the test device without the distal end of the PCF being permanently adhered to the testing device. For example, the body of the PCF may have a hexagonally tubular shape with a groove on one of the faces with a removable connector formed to receive the hexagonally tubular shape and groove of the PCF., so that the cores of the PCF may be self-aligning with the emitters and detectors of the testing device.

Figure 4:
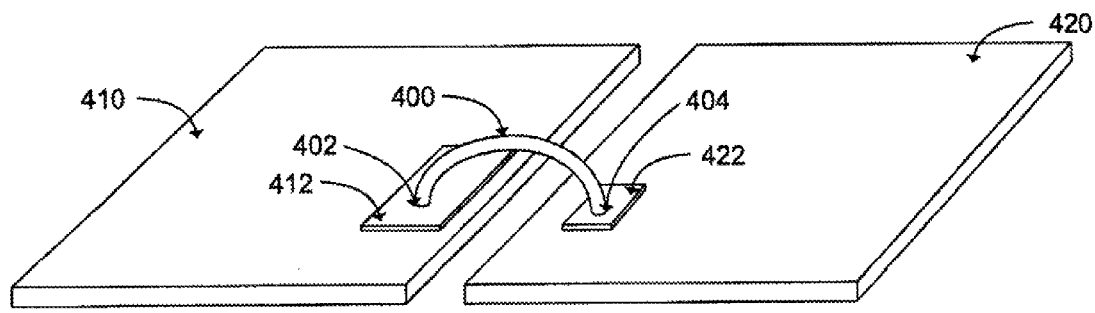
FIG. 4 is an illustration of a photonic crystal fiber having a plurality of cores coupled between two optical devices in accordance with an embodiment of the present invention.

FIG. 4 provides an illustration of an embodiment for adhering the proximal end 402 of the PCF 400 to the surface of the proximal optical device 412 and adhering the distal end 404 of the PCF to the surface of the distal optical device 422. The distal end of the PCF may be placed, positioned, aligned, and adhered to the surface of the distal optical device using a substantially similar method used to place, position, align, and adhere the proximal end of the PCF to the surface of the proximal optical device, wherein the term distal may be substituted for the term proximal in any method using proximal end and proximal optical device. The proximal optical device 412 may be coupled to another mechanical, electrical, or optical device 410, or a combination thereof. Likewise, the distal optical device 422 may be coupled to another mechanical, electrical, or optical device 420, or a combination thereof.

Figure 5:
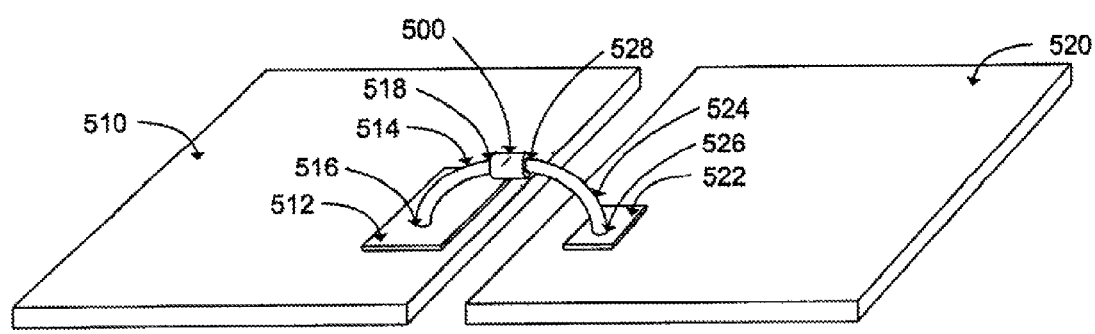
FIG. 5 is an illustration of two photonic crystal fibers having a plurality of cores coupled between two optical devices using a connector to connect the fibers in accordance with an embodiment of the present invention.

FIG. 5 provides an illustration of an embodiment for adhering two optical devices to two PCFs and coupling the PCFs using a connector. The method may include adhering a proximal end 516 of a first PCF 514 to a surface of a first proximal optical device 512, adhering a proximal end 526 of a second PCF 524 to the surface of a second proximal optical device 522, coupling a distal end 518 of the first PCF to a first side of a connector 500, and coupling a distal end 528 of the second PCF to a second side of the connector. The connector may be optically coupled so the cores of the distal ends of the first and the second PCF may allow coherent beams of light to travel from the first proximal optical device to the second proximal optical device, and a coherent beam of light to travel from the second proximal optical device to the first proximal optical device.

Using a connector 500 between optical devices can allow a first optical device 512 to be replaced with minimal effort since removing the second PCF 524 from the second optical device 522 may not be necessary. The connector may allow the first optical device to be optically decoupled from the second optical device so the first optical device may be optically coupled to a third optical device with relative ease. The connector may be removable so the PCF may be decoupled from the connector without undue force or chemicals to remove an adhesive. The connection between the PCF and connector may be self aligning so the placement of the PCF into the connector will align each core so the cores of the distal ends of the first and the second PCF may allow coherent beams of light to travel to and from the first proximal optical device to and from the second proximal optical device. The first and the second optical devices may be coupled to other devices 510 and 520, respectively.

Figure 6:
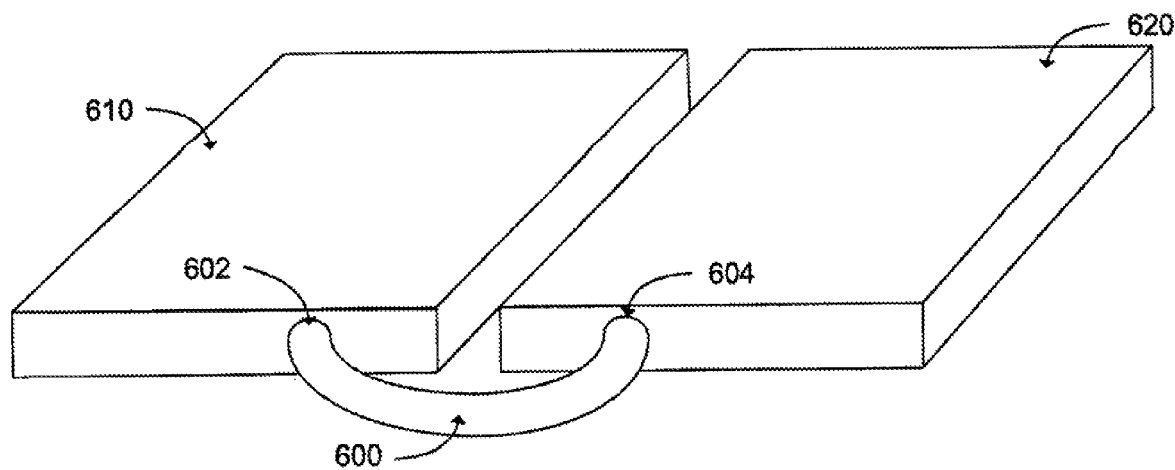
FIG. 6 is an illustration of a photonic crystal fiber having a plurality of cores coupled between two optical devices in accordance with an embodiment of the present invention.

FIG. 6 provides an illustration of an embodiment of a method for adhering the proximal end 602 of the PCF 600 to a smaller surface of the proximal optical device 610 and for adhering the distal end 604 of the PCF to a smaller surface of the distal optical device 620. The ends of the PCF may be adhered to any surface on the optical device.

A connector can be formed using the methods described. For example, using two cores and couplings pads to align and adhere a multicore PCF to an optical device may result in all the cores of the PCF being aligned with their corresponding coupling pads on the optical device.

Figure 7:
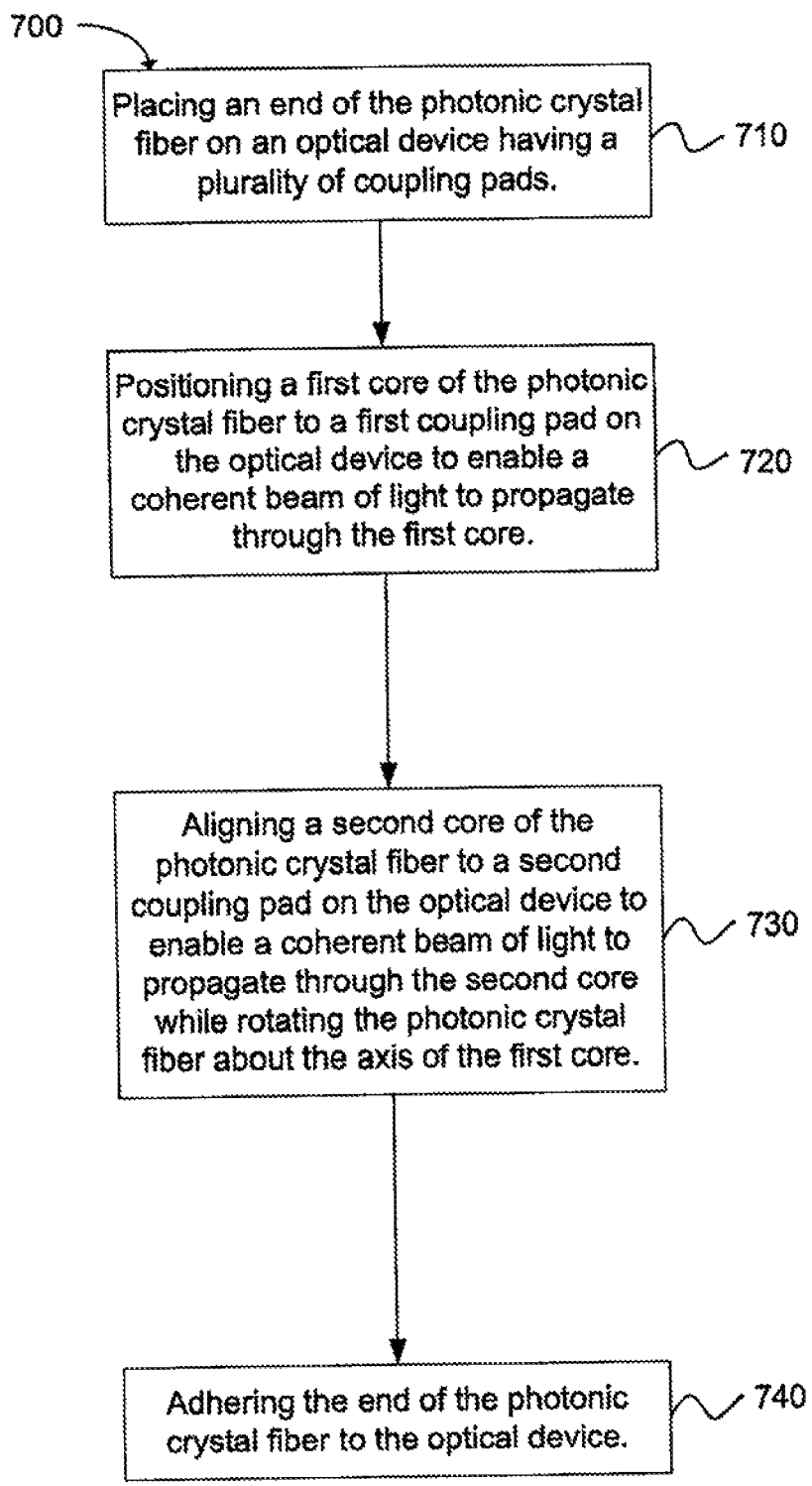
FIG. 7 is a flow chart illustrating a method for connecting a photonic crystal fiber having a plurality of cores to an optical device in accordance with an embodiment of the present invention.

Another embodiment provides a method 700 for connecting a photonic crystal fiber having a plurality of cores to an optical device, as shown in the flow chart in FIG. 7. The method includes the operation of placing 710 a proximal end of the photonic crystal fiber on a surface of a proximal optical device having a plurality of coupling pads. The operation of positioning 720 a first core of the proximal end of the photonic crystal fiber to a first coupling pad on the proximal optical device follows. Positioning the first core to the first coupling pad can enable a threshold amount of a coherent beam of light to propagate through the first core and the first coupling pad.

The method 700 further includes aligning 730 a second core of the proximal end of the photonic crystal fiber to a second coupling pad on the proximal optical device. Aligning the second core to the second coupling pad can enable a threshold amount of a coherent beam of light to propagate through the second core and the second coupling pad. The position of the first core relative to the first coupling pad can be maintained by rotating the photonic crystal fiber about the axis of the first core while the second core is being aligned to the second coupling pad. After the second core is aligned to the second coupling pad, the operation of adhering 740 the proximal end the photonic crystal fiber to the surface of the proximal optical device can be performed while maintaining a position of the first and the second cores relative to the first and the second coupling pads, respectively.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for connecting a photonic crystal fiber having a plurality of cores to an optical device, comprising:
    placing a proximal end of the photonic crystal fiber on a surface of a proximal optical device having a plurality of coupling pads;
    positioning a first core of the proximal end of the photonic crystal fiber to a first coupling pad on the proximal optical device to enable a threshold amount of a coherent beam of light to propagate through the first core and the first coupling pad;
    aligning a second core of the proximal end of the photonic crystal fiber to a second coupling pad on the proximal optical device to enable a threshold amount of a coherent beam of light to propagate through the second core and the second coupling pad while maintaining the position of the first core relative to the first coupling pad by rotating the photonic crystal fiber about the axis of the first core; and
    adhering the proximal end of the photonic crystal fiber to the surface of the proximal optical device while maintaining the position of the first and the second cores relative to the first and the second coupling pads, respectively.

2. The method of claim 1, further comprising:
    placing a distal end of the photonic crystal fiber on a surface of a distal optical device having a plurality of coupling pads;
    positioning a first core of the distal end of the photonic crystal fiber to a first coupling pad on the distal optical device to enable a threshold amount of a coherent beam of light to propagate through the first core and the first coupling pad;
    aligning a second core of the distal end of the photonic crystal fiber to a second coupling pad on the distal optical device to enable a threshold amount of a coherent beam of light to propagate through the second core and the second coupling pad on the distal optical device while maintaining the position of the first core of the distal end relative to the first coupling pad on the distal optical device by rotating the photonic crystal fiber about the axis of the first core; and
    adhering the distal end of the photonic crystal fiber to the surface of the distal optical device while maintaining the position of the first and the second cores of the distal end relative to the first and the second coupling pads on the distal optical device, respectively.

3. The method of claim 1, wherein aligning the second core of the proximal end of the photonic crystal fiber to the second coupling pad on the proximal optical device to enable a threshold amount of a coherent beam of light to propagate through the second core enables each of the plurality of cores of the photonic crystal fiber to propagate at least the threshold amount of the coherent beam of light.

4. The method of claim 1, wherein connecting the photonic crystal fiber having the plurality of cores to the optical device uses the photonic crystal fiber with the plurality of cores selected from the group consisting of a solid, a gas, a liquid, and a void.

5. The method of claim 1, wherein connecting the photonic crystal fiber having the plurality of cores to the optical device uses the optical device selected from the group consisting of a computer chip, a printed circuit board, an electro-optic board, an electro-optic chip, an electro-optic die, an electro-optic wafer, an electro-optic substrate, an optical board, an optical chip, an optical die, an optical wafer, and an optical substrate.

6. The method of claim 1, wherein placing the proximal end of the photonic crystal fiber on the surface of the proximal optical device having the plurality of coupling pads uses coupling pads selected from the group consisting of a wave guide coupler, an emitter, a detector, a pigtail, a plurality of wave guide couplers, a plurality of emitters, a plurality of detectors, a plurality of emitters or detectors coupled to a wave guide coupler, a plurality of emitters and detectors coupled to a wave guide coupler, and combination thereof.

7. The method of claim 6, wherein placing the proximal end of the photonic crystal fiber on the surface of the proximal optical device having the plurality of coupling pads uses the wave guide coupler coupling pad selected from the group consisting of a grating coupling and a titled-facet coupling.

8. The method of claim 1, wherein positioning the first core of the proximal end of the photonic crystal fiber to the first coupling pad on the proximal optical device to enable the threshold amount of the coherent beam of light to propagate through the first core and the first coupling pad, and aligning the second core of the proximal end of the photonic crystal fiber to the second coupling pad on the proximal optical device to enable the threshold amount a coherent beam of light to propagate through the second core and the second coupling pad further comprises using a testing device coupled to a distal end of the photonic crystal fiber, wherein the testing device comprises a plurality of detectors oriented to be substantially aligned with the plurality of cores of the distal end of the photonic crystal fiber so that the detectors can detect a coherent beam of light traveling through the plurality of cores from the plurality of coupling pads at the proximal optical device to enable the plurality of cores at the proximal end of the photonic crystal fiber to be positioned and aligned with the plurality of coupling pads at the proximal optical device.

9. The method of claim 1, wherein positioning the first core of the proximal end of the photonic crystal fiber to the first coupling pad on the proximal optical device to enable the threshold amount of the coherent beam of light to propagate through the first core and the first coupling pad, and aligning the second core of the proximal end of the photonic crystal fiber to the second coupling pad on the proximal optical device to enable the threshold amount a coherent beam of light to propagate through the second core and the second coupling pad further comprises using a testing device coupled to a distal end of the photonic crystal fiber, wherein the testing device comprises a plurality of emitters oriented to be substantially aligned with the plurality of cores of the distal end of the photonic crystal fiber so that the emitters can emit a coherent beam of light traveling through the plurality of cores to be detected at the plurality of coupling pads at the proximal optical device to enable the plurality of cores at the proximal end of the photonic crystal fiber to be positioned and aligned with the plurality of coupling pads at the proximal optical device.

10. The method of claim 1, further comprising coupling a connector to a distal end of the photonic crystal fiber, wherein the connector comprises a plurality of optical couplings to optically couple the plurality of cores of two photonic crystal fibers together, wherein a first end of the connector comprises a plurality of optical couplings to be substantially aligned with the plurality of cores of the distal end of the photonic crystal fiber so a coherent beam of light can propagate through each of the plurality of cores from the plurality of coupling pads at the proximal optical device to a plurality of optical couplings of a second end of the connector.

11. The method of claim 1, wherein positioning the first core and aligning the second core further comprises enabling a substantial, maximum amount of light to propagate through the first core and the first coupling pad and the second core and the second coupling pad, respectively.

12. The method of claim 1, wherein adhering the photonic crystal fiber further comprises adhering the proximal end and a distal end using an ultraviolet curable epoxy.

13. The method of claim 2, further comprising verifying an alignment of the plurality of cores in the photonic crystal fiber with the plurality of coupling pads of the proximal and distal optical devices by measuring an intensity of a coherent beam of light traveling through a third core and a third coupling pad of the photonic crystal fiber from one of the proximal and the distal optical devices to the other of the proximal and distal optical devices, wherein the intensity of the coherent light beam in the third core is used to determine whether first core and the second core in the photonic crystal fiber are properly aligned with their respective coupling pads on the proximal and distal optical devices.

14. The method of claim 1, wherein connecting the photonic crystal fiber having the plurality of cores to the optical device uses the photonic crystal fiber with a distance on an end of the photonic crystal fiber between the first and the second core is a substantially maximum distance between any two active cores of the photonic crystal fiber, wherein an active core comprises a core that is optically coupled to a coupling pad capable of emitting or detecting light.

15. A photonic crystal fiber having a plurality of cores adhered to a proximal optical device having a plurality of coupling pads, wherein a proximal end of the photonic crystal fiber has a first core aligned with a first coupling pad and a second core aligned with a second coupling pad to enable a threshold amount of light to propagate through the first core and the first coupling pad and the second core and second coupling pad, respectively, wherein the plurality of cores exceeds the number of active coupling pads, wherein active coupling pads are capable of emitting or detecting light.

16. The photonic crystal fiber of claim 15, furthering comprising the photonic crystal fiber adhered to a distal optical device having a plurality of coupling pads, wherein a distal end of the photonic crystal fiber has a first core aligned with a first coupling pad on the distal optical device and a second core aligned with a second coupling pad on the distal optical device to enable a threshold amount of light to propagate through the first core and the first coupling pad and the second core and second coupling pad, respectively.

17. The method of claim 15, wherein the coherent beam of light through the first core and the second core comprises a plurality of wavelengths providing a plurality of channels.

18. The method of claim 15, further comprising spacing between the cores of the photonic crystal fiber is at least twice as great as a diameter of the cores.

19. The method of claim 15, wherein the plurality of cores in the photonic crystal fiber are substantially uniform in size, shape, and position at both ends of the photonic crystal fiber.

20. A means for connecting a photonic crystal fiber having a plurality of cores to an optical device, comprising:
  a means for placing a proximal end of the photonic crystal fiber on a surface of a proximal optical device having a plurality of coupling pads;
  a means for positioning a first core of the proximal end of the photonic crystal fiber to a first coupling pad on the proximal optical device to enable a threshold amount of a coherent beam of light to propagate through the first core and the first coupling pad;
  a means for aligning a second core of the proximal end of the photonic crystal fiber to a second coupling pad on the proximal optical device to enable a threshold amount of a coherent beam of light to propagate through the second core and the second coupling pad while maintaining the position of the first core relative to the first coupling pad by rotating the photonic crystal fiber about the axis of the first core; and
  a means for adhering the proximal end of the photonic crystal fiber to the surface of the proximal optical device while maintaining the position of the first and the second cores relative to the first and the second coupling pads, respectively.

* * * * *

UNITED STATES PATENT AND TRADEMARK OFFICE
CERTIFICATE OF CORRECTION

PATENT NO.         : 7,845,860 B2                                          Page 1 of 1
APPLICATION NO.    : 12/254490
DATED              : December 7, 2010
INVENTOR(S)        : Marco Fiorentino et al.

It is certified that error appears in the above-identified patent and that said Letters Patent is hereby corrected as shown below:

In column 8, line 56, in Claim 8, delete "amount a coherent" and insert -- amount of a coherent --, therefor.

In column 9, line 8, in Claim 9, delete "amount a coherent" and insert -- amount of a coherent --, therefor.

Signed and Sealed this
Twenty-ninth Day of March, 2011

David J. Kappos
*Director of the United States Patent and Trademark Office*